US008386541B2

(12) United States Patent
Merritt (10) Patent No.: US 8,386,541 B2
(45) Date of Patent: Feb. 26, 2013

(54) DYNAMIC CHANGE DATA CAPTURE PROCESS

(75) Inventor: Carlton Merritt, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 831 days.

(21) Appl. No.: 12/211,297

(22) Filed: Sep. 16, 2008

(65) Prior Publication Data

US 2010/0070536 A1  Mar. 18, 2010

(51) Int. Cl.
*G06F 12/00* (2006.01)
(52) U.S. Cl. ........ 707/942; 707/602; 707/607; 707/702; 707/769; 707/812; 705/75; 715/205
(58) Field of Classification Search .................. 707/702, 707/769, 812; 705/75; 715/205
See application file for complete search history.

(56) References Cited

U.S. PATENT DOCUMENTS

| | | | | |
|---|---|---|---|---|
| 5,664,172 | A | * | 9/1997 | Antoshenkov ................ 707/700 |
| 6,687,695 | B1 | | 2/2004 | Miller et al. |
| 6,694,315 | B1 | * | 2/2004 | Grow ..................................... 1/1 |
| 7,143,099 | B2 | | 11/2006 | Lecheler-Moore et al. |
| 2003/0014335 | A1 | * | 1/2003 | Lecheler-Moore et al. .... 705/30 |
| 2003/0182169 | A1 | * | 9/2003 | Kalmick et al. ................... 705/8 |
| 2004/0193565 | A1 | * | 9/2004 | Feng et al. ......................... 707/1 |
| 2005/0240578 | A1 | * | 10/2005 | Biederman et al. ............... 707/3 |
| 2006/0036448 | A1 | * | 2/2006 | Haynie et al. ..................... 705/1 |
| 2006/0173917 | A1 | * | 8/2006 | Kalmick et al. ........... 707/104.1 |
| 2008/0301123 | A1 | * | 12/2008 | Schneider et al. ................ 707/5 |
| 2009/0299987 | A1 | * | 12/2009 | Willson ............................. 707/4 |

OTHER PUBLICATIONS

Higa et al., IEEE, pp. 365-373, 1989.*
http://www.embarcadero.com/products/dtstudio/dtdatasheet.pdf retrieved on Nov. 14, 2008.
http://www.sun.com/third-party/srsc/resources/informatica/PC8_brochure.pdf retrieved on Nov. 14, 2008.
http://www.oracle.com/technology/products/warehouse/11gr1/datasheets/warehouse-builder-11g-etl-datasheet.pdf retrieved on Nov. 14, 2008.
http://www.connx.com/products/pdf/CONNXDatabases.pdf retrieved on Nov. 14, 2008.
http://www.eucalypt.net.au/DataMirror/datamirror.asp retrieved on Nov. 14, 2008.
http://www.goldengate.com/pdfs/GoldenGate_Solution_Overview.pdf retrieved on Nov. 14, 2008.
http://www.sybase.com/files/Data_Sheets/Sybase_PowerDesigner_DMOverview_ds.pdf retrieved on Nov. 14, 2008.
http://www.oracle.com/technology/products/dataint/htdocs/streams_fo.html retrieved on Nov. 14, 2008.
http://www.ibm.com/developerworks/db2/library/techarticle/0305milligan/0305milligan.html retrieved on Nov. 14, 2008.
http://www.redbooks.ibm.com/abstracts/tips0604.html retrieved on Nov. 14, 2008.

*Primary Examiner* — Cheyne Ly
(74) *Attorney, Agent, or Firm* — Weiss & Arons LLP; Michael Springs (57) ABSTRACT

Systems and methods for dynamically creating Entity-Specific Views from one or more Data Warehouses are provided. The system may involve multiple data sets within a Data Warehouse and may provide a Target Result data set which excludes fields of information not relevant to the desired view. The system may involve the use of derived fields and logical decision structures for the assignment of overriding boundary date information.

9 Claims, 7 Drawing Sheets

FIG. 1

```
┌─────────────────────────────────────────┐
│ 1.0 CREATE DISTINCT LIST OF PRIMARY     │
│ KEY-TO-BEGIN AND END DATE COMBINATIONS  │         ← 200
│ ACROSS ALL SOURCE DATA INPUTS BASED ON  │
│ A TIME RANGE. THIS IS CALLED THE        │
│ "COMPOSITE KEY" AND IS THE 1.0 RESULT SET. │
└─────────────────────────────────────────┘
                    ↓ 299
┌─────────────────────────────────────────┐
│ 1.1.1 IDENTIFY PK FIELDS ON ALL SOURCE  │
│                TABLES                   │
└─────────────────────────────────────────┘
                    ↓ 201
┌─────────────────────────────────────────┐
│ 1.1.2 IDENTIFY FK FIELDS ACROSS ALL SOURCE │
│ TABLES WHICH RELATE THEM (SOURCE        │
│ TABLES) TO EACH OTHER BY PK AND BY GRAIN│
└─────────────────────────────────────────┘
                    ↓ 202
┌─────────────────────────────────────────┐
│ 1.1.3 COMBINE 1.1.1 PK TO 1.1.2 FK TO CREATE │
│ A "GROUPING" KEY USED SELECT A DISTINCT │
│ LIST OF BEGIN DATE TO END DATE          │
│ COMBINATIONS ACROSS ALL SOURCE TABLES   │
└─────────────────────────────────────────┘
                    ↓ 203
┌─────────────────────────────────────────┐
│ 1.2 CREATE DERIVED FIELD t_rank USED TO │
│ MERGE BEGIN AND END DATS FOR EACH       │
│ GROUPING KEY CREATED IN 1.1.3           │
└─────────────────────────────────────────┘
                    ↓ 204
┌─────────────────────────────────────────┐
│ 1.3 CREATE DERIVED FIELD oride_end_dt   │
│ USED TO MERGE BEGIN AND END DATES FOR   │
│ EACH GROUPING KEY CREATED IN 1.1.3      │
└─────────────────────────────────────────┘
                    ↓ 205
┌─────────────────────────────────────────┐
│ 1.4 GROUPING ON "GROUPING" KEY + BEGIN  │
│ DATE. SELECT THE MAXIMUM END DATE.      │
│ THIS IS THE COMPOSITE KEY               │
└─────────────────────────────────────────┘
                                    206
```

DYNAMIC CHANGE DATA CAPTURE PROCESS

FIELD OF TECHNOLOGY

Aspects of the disclosure relate to relational databases.

BACKGROUND

A Data Warehouse is the repository of an organization's electronically stored data. Data Warehousing is the process of building a data warehouse and of facilitating the reporting and analysis of information in the data warehouse.

A Change Data Capture ("CDC") is a set of software design patterns used to determine the data that has changed in a dataset so that action can be taken using the changed data. A CDC may allow for the capture and preservation of data states across time.

An Online Transaction Processing data set ("OLTP") refers to the data set created or accessed by transaction-oriented applications, typically for data entry and retrieval transaction processing. For the purposes of this application, "transaction" may refer to a computer or database transaction such as a database read or write. "Transaction" in this context may also refer to a business or commercial transaction such as a sale or bank withdrawal. Online transaction processing systems typically respond in real-time to user requests.

A Data Warehouse ("DW") may be derived from one or more OLTPs. A DW may be created by periodically applying a CDC to an OLTP.

A DW may not necessarily retain the data structure and format of an OLTP from which it is derived. For instance, it is typical in the banking context for transactions within an OTLP to be recorded with a granularity approaching real time but the DW derived from that OLTP to be recorded with only daily granularity.

The DW derived by the application of a CDC to an OLTP over time will contain records and fields. A record is defined for the purposes of this application as a collection of fields. A field, for the purposes of this application, can contain a single data point, a pointer to another record, or another record.

When a CDC is applied to an OLTP, the changes recorded may concern changes at the record level, such that a change to a single field within a record will be recorded by the CDC as a change to the entire record.

Records, including records in a DW may have boundary dates, consisting of an effective date and an end date. The effective date may be the date on which the data reflected by a particular record becomes valid, and the end date may be the latest date on which the data reflected in a particular record is valid, or the date one increment before that data is changed. Before a particular record is changed, or when the record as changed remains current, it may be assigned a theoretical maximum end date, such as Dec. 31, 9999.

Boundary dates may be dates, or can be members of any totally ordered set as that term is understood mathematically, whether or not bound to a progression external to the data. Where boundary dates are not dates per se, terms such as "earlier," "later," and "historical" are given meanings that are analogous to those terms when used in the context of dates per se.

An element-specific view ("ES view") is a view of a DW that reflects a CDC on only a subset of the fields or records normally analyzed when creating or updating a DW. An ES view may also maintain historical information for that subset.

Conventionally, creating an ES view requires the application of an Extract, Transform and Load ("ETL") process to archived or original OLTP datasets, essentially creating a new DW structured to support the ES view.

Conventionally, creating an ES view from an existing DW requires parsing the DW so as to reverse-engineer an "echo" of the OLTP datasets over time, and then applying an ETL process to those datasets.

In either case, the ETL creates a series of "deltas," which reflect the changes in the OLTP dataset or any existing or created archive of OLTP datasets, filtered for the fields.

An example of a possible relationship between fields, records, and boundary dates is provided in FIGS. 4-6, discussed below.

Conventionally, returning an ES view specific to a particular element requires either returning to the OLTP or archives thereof and running an ETL process over those datasets, tuned to extract the particular element and exclude other record changes, transforming that information for format and granularity, and then loading that information as a separate dataset, consisting of an initial state and a series of "deltas" recording the changes in that state. Alternately, the DW could be mechanically parsed, essentially creating an OLTP archive, and then running an ETL process over that recreated OLTP archive.

Typically, ETL processes may be very resource- and time-intensive. Further, the newly created element-specific DW may be a very large file. Further, the element-specific DW may create multiple duplicative data points distinct from the original DW, giving rise to data integrity issues.

Typically, users may require many different ES views, magnifying the problems presented by the conventional approach.

It is desirable, therefore, to provide systems or methods for ES views to be generated from the original DW virtually or dynamically.

SUMMARY OF THE INVENTION

It is an object of this invention to provide systems or methods for generating ES views while minimizing the problems enumerated. Systems or methods for generating ES views from one or more DWs virtually or dynamically are therefore provided.

A system or method for creating a Dynamic Change Data Capture ("DCDC") over one or more DWs is therefore provided.

Given a table or tables reflecting the historical data changes to one or more records, the DCDC returns a result set reflecting all of the historical changes to those records and limited to changes in those field/elements specified.

In some embodiments, the result set may be arranged such that the historical data changes reflected are set forth chronologically.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Systems or methods for generating ES views from one or more original DWs virtually or dynamically are provided.

In some embodiments, the DCDC is applied to more than one DW. The principles of the invention are unaffected by the number of DWs to which the DCDC is applied.

The DCDC may involve two broad steps, first merging functionally identical rows within a table, and then joining the tables by foreign key relationship over the boundary dates.

For the purposes of this application, "joining" may be combining records from two or more tables in a relational database, resulting in a new table; joining may also be thought of as an SQL operation that relates tables by means of values common between them.

For the purposes of this application, "merging" may be conditionally updating rows of a table, or inserting new rows into a table, or both.

In the first step, the DCDC may parse individual history tables, excluding from consideration any fields not included in the entity-specific requirements.

By the exclusion of the non-required fields, certain rows in each of the individual history tables may be functionally identical, except for the boundary date values of those rows.

The DCDC may merge those functionally identical rows using the earliest of the effective dates and the latest of the end dates for those fields where the boundary dates for those rows are sequential.

The DCDC may then join the tables by foreign key relationships over time, resolving overlapping date ranges in the boundary dates, and splitting rows that span boundary dates.

The DCDC may join the tables by proceeding in a series of steps.

The first step may be to create a "composite key," which may be a distinct list of combinations of primary keys and boundary dates across all relevant source data inputs.

The composite key may be created by extracting or referencing the appropriate records across all relevant source data tables and creating a distinct table based on the primary/foreign keys over those tables.

The DCDC may then join those tables. The joined table may contain rows with boundary dates overlapping the boundary dates of other rows in the table. Overlapping boundary date ranges may be complete straddles (where the effective date of one row is the same or less than the effective date of another row and the end date of that same row is the same or greater than the end date of the other) or partial straddles (where the effective and end dates of one row are both greater than the effective and end dates of another row.)

The DCDC in joining the tables to create the composite key may resolve the overlapping boundary date issues by creating and using certain derived fields.

The DCDC may order the rows of the joined table in descending order by the end date of each row, and then implement a non-standard ranking of the table over the effective date, such that the rank counter is incremented only when the effective date is different from the effective date of the immediately preceding row. The DCDC may also create for each row in the table a field containing that rank (t_rank).

As an alternative to the mechanism described immediately above, the DCDC may order the rows of the joined table in descending order by the end date of each row, and as a second criteria by the begin dates within the end dates, and then ranking the table over the begin dates. The DCDC may include the value so derived in the field created for each row in the table to store that rank (t_rank).

For the purposes of this application "ranking" may be computing the ordinal rank of a row within a table. Without qualification, "ranking" may be non-dense ranking, wherein rows that are not distinct from each other with respect to the ordering criteria may be assigned the same rank, and there may be one or more gaps in the sequential rank numbering.

For the purposes of this application "ranking densely" may be computing the ordinal rank of a row within a table wherein there are no gaps in the sequential rank numbering of rows.

The DCDC may also create for each row a field containing the potentially overriding end date for that row (oride_end_dt). The DCDC may do so by subtracting one unit from the effective date of the row immediately preceding the active row where the rows are ordered in descending order by the end date.

If there is no row immediately preceding the active row (t_rank=1) then a potentially overriding end may be derived by simply subtracting one from the effective date of that row.

As an alternative to the mechanism described immediately above, the DCDC may assign a NULL value or other arbitrary and unique value to the oride_end_dt field for the row for which t_rank=1.

The DCDC may then further derive a trial end date (trial_end_dt) for each row in the table by the application of a series of conditional tests. The DCDC may create for each row an additional field containing that derived value.

One implementation of the logic underlying the derivation of trial_end_dt is set forth in greater detail in FIG. 7, discussed below.

The DCDC may then group the rows over the effective date, and within each such group select the row with the greatest trial_end_dt value. The DCDC may then assign that value as the new end date for those rows.

At this point in the process, the result of the DCDC process may be referred to as the Composite Key.

The DCDC may then select from each source table the subset of fields necessary to create the ES view, using the primary key and start date information to select the necessary field information.

The datasets, as noted above, are reflective of changes made to all the fields on each table. As such, by the elimination of field information not necessary to create the ES view, the selected dataset may contain rows or records that are duplicative of each other except for the relevant boundary dates. The DCDC may then proceed to identify and collapse these rows using the effective date and end date.

The DCDC may first group rows together, by sorting each source table over all fields relevant to the ES View exclusive of the boundary date fields and the derived boundary date fields, and sorting on the boundary dates as a secondary or ancillary key.

Once sorted, the DCDC may rank those rows, using a non-dense ranking (u_rank). The value of that non-dense ranking may be added to the row as an additional field.

The DCDC may also rank the rows densely, adding a field to that row containing that value (v_rank).

The DCDC may then sort the rows using the u_rank as a primary key and v_rank (ascending) as a secondary key.

The DCDC may then derive an CDC rank indicator field (w_rank) by analyzing each row. Within each group of rows with the same u_rank, if the v_rank of that row is equal to the v_rank of the row preceding incremented by one, the DCDC may assign a w_rank of zero. If the v_rank of that row is not equal to the v_rank of the row preceding incremented by one, the DCDC may assign the row's v_rank as the w_rank.

The DCDC may then further derive an overriding u_rank field (oride_u_rank). If the w_rank of a given row is not zero (which is to say if the v_rank of that row is not equal to the v_rank of the row preceding incremented by one), the DCDC may set the oride_u_rank to the w_rank. If the w_rank of a given row is zero, then the DCDC may assign to oride_u_rank the highest w_rank value of all preceding rows, including the row under consideration.

The DCDC may then use the derived fields to collapse duplicate rows.

The DCDC may group all rows with the same u_rank and oride_u_rank values together. Within each grouping, the DCDC may select the row with the latest begin date as the "merged row," assigning to that merged row the earliest begin date within the grouping and the latest end date within the grouping.

The collapsed source tables that are the results of these steps may be referred to as the 2.0 Result Set.

The DCDC may then join the 2.0 Result Set tables using the Composite Key.

The DCDC may do so by selecting from each table within the 2.0 Result Set one row for each row in the Composite Key. The DCDC may select the row that has the latest begin date among those rows that have a begin date equal to or earlier than the begin date of the relevant row in the Composite Key.

The DCDC may then join the result sets so selected using the Composite Key, creating the Target Result Set.

The Target Result Set will represent a ES view of the original DWs.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
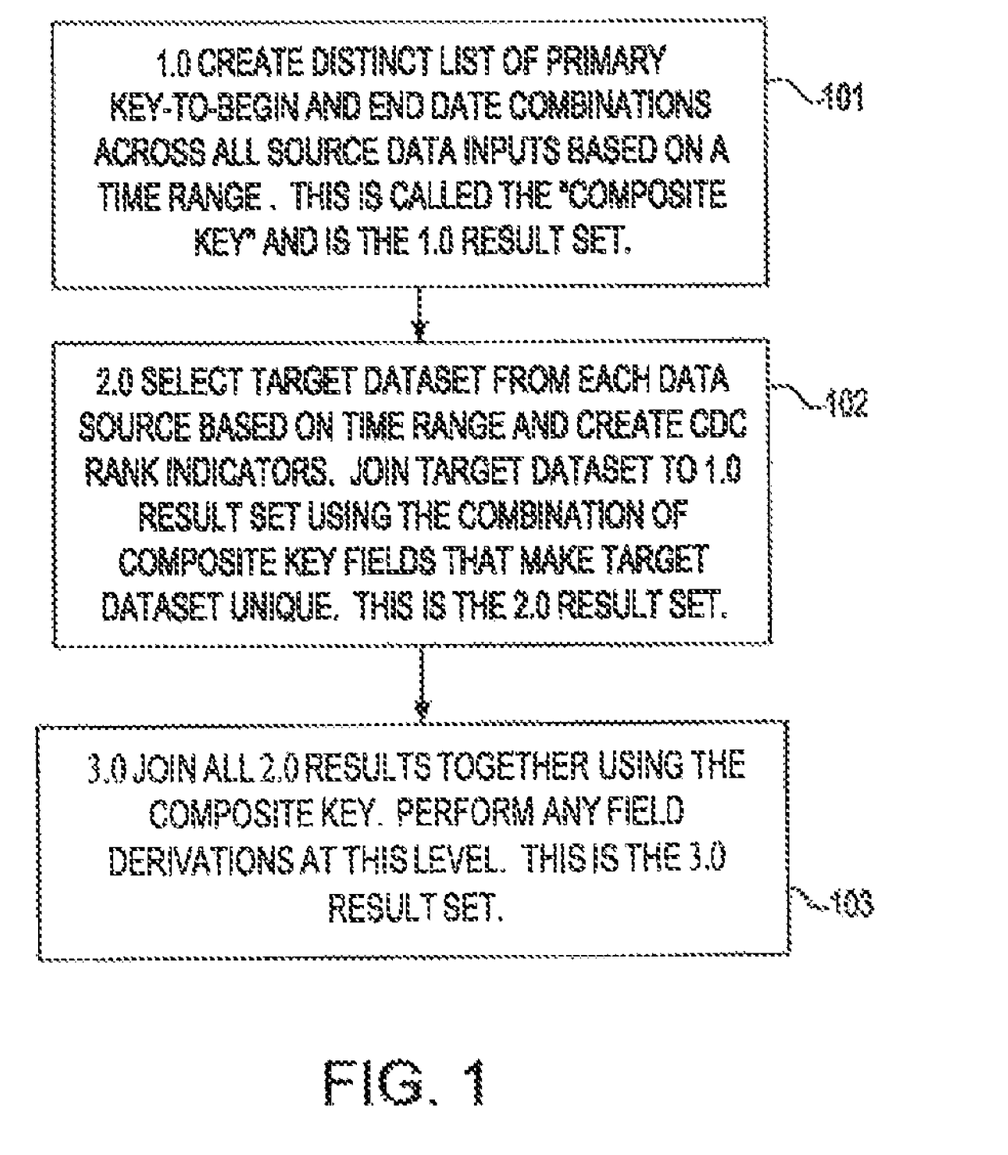
FIGS. 1-3 are flow diagrams that show processes that correspond to a portion of the overall system or process in accordance with the principles of the invention.

FIG. 1 shows illustrative process 100 for implementing the invention, in overview.

At step 101 the DCDC may create a distinct list of primary key and boundary date combinations across all source data inputs based on a time range. The result of step 101 is called the 1.0 Result Set or the "composite key."

At step 102 the DCDC may select a target dataset from each data source based on the constraints provided and creates CDC rank indicators. The DCDC may further join the target dataset to the 1.0 Result Set using a combination of composite key fields that make the target dataset unique. The result of step 102 is called the 2.0 Result Set or 2.0 Results.

At step 103 the DCDC may join any multiple 2.0 Result Sets using the composite key and perform any field derivations. The result of step 103 is called the 3.0 Result Set.

Figure 2:
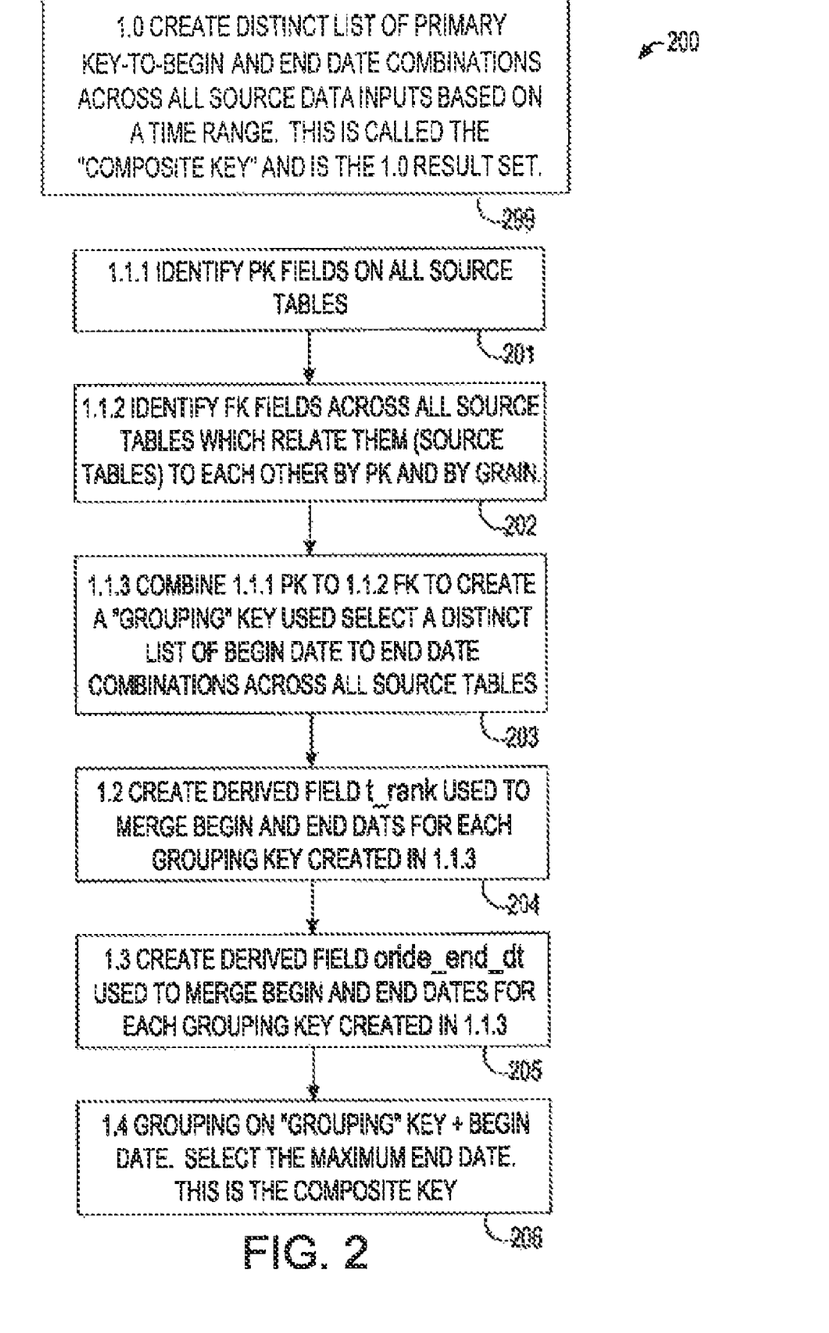

FIG. 2 shows illustrative process 200 for implementing the invention, showing a part of the invention in more detail.

Illustrative process 200, more fully described at step 299, is a more detailed illustration of step 101 in FIG. 1. Steps 201-206 are substeps of step 299.

At step 201 the DCDC may identify the primary key fields on all source tables.

At step 202 the DCDC may identify foreign key fields across all source tables which relate the source tables to each other by primary key and by granularity.

At step 203 the DCDC may combine the primary key fields identified in step 201 with the foreign key field identified in step 202, creating a grouping key that the DCDC can use to select a distinct list of begin- and end-date combinations across all source tables.

At step 204 the DCDC may derive a field t_rank and may use that derived field to merge begin and end dates for each grouping key created in step 203.

At step 205 the DCDC may derive a field oride_end_dt which may be used to merge begin and end dates for each grouping key created in step 203.

At step 206 the DCDC may group on the grouping key created in step 203 and the begin date, selecting the end date, creating the composite key.

Figure 3:
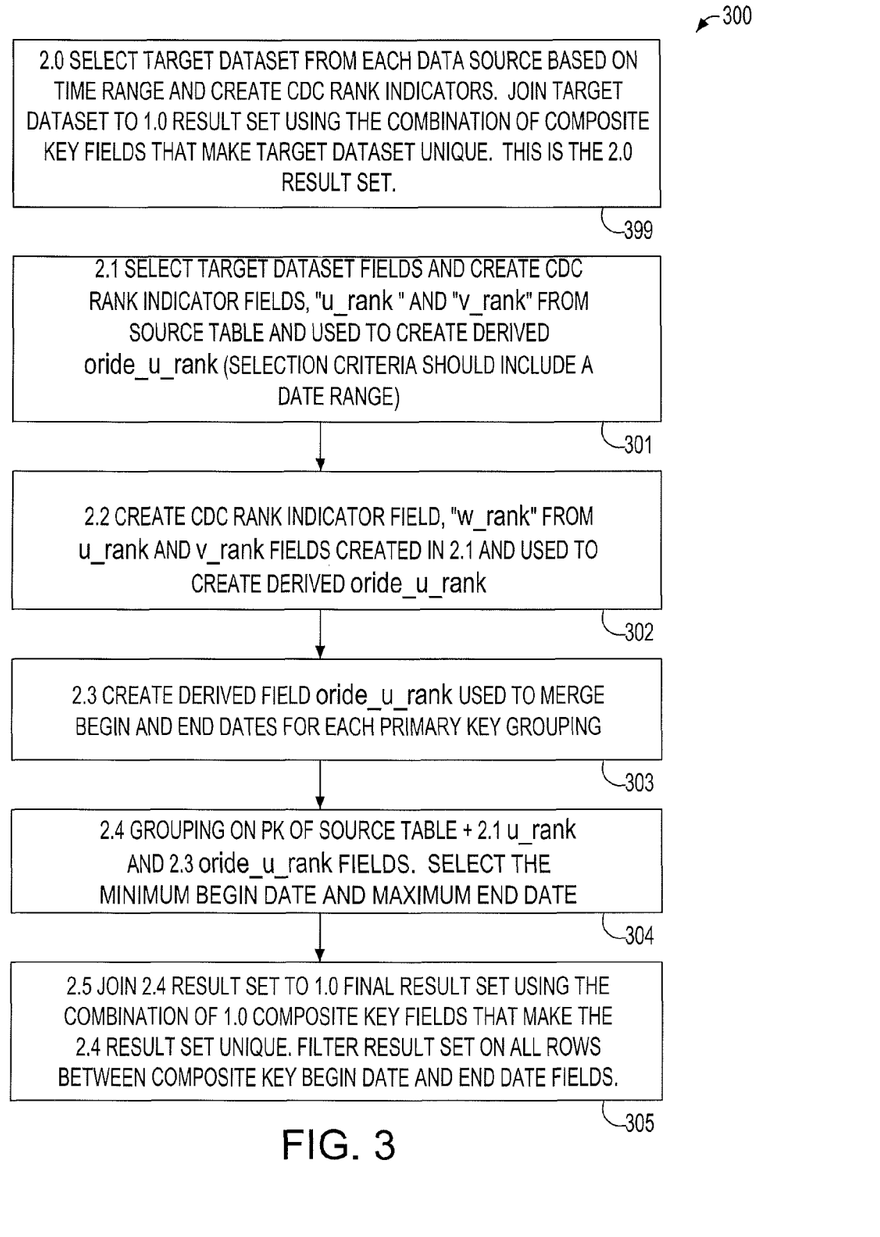

FIG. 3 shows illustrative process 300 for implementing the invention, showing a part of the invention in more detail.

Illustrative process 300, more fully described at step 399, is a more detailed illustration of step 102 in FIG. 1. Steps 301-305 form substeps of step 399.

At step 301 the DCDC may select a target dataset and may create CDC rank indicator fields t_rank and v_rank from the source table and may use those to derive field oride_t_rank.

At step 302 the DCDC may create CDC rank indicator field x_rank from t_rank and v_rank fields created in step 301 and then may use that information to modify created oride_t_rank.

At step 303 the DCDC may use derived field oride_t_rank to merge begin and end dates for each primary key grouping.

At step 304 the DCDC may select the minimum begin and maximum end dates, grouping on the primary key of the source tables and the t_rank field created in step 301 and the oride_t_rank field created in step 303.

At step 305 the DCDC may join the data selected in step 304 to the composite key established in step 206 (of FIG. 2) using a combination of those fields within the composite key that make unique the data selected in 304. The DCDC may also filter the result set on all rows or ranks between the composite key begin date and end date fields.

Figure 4:
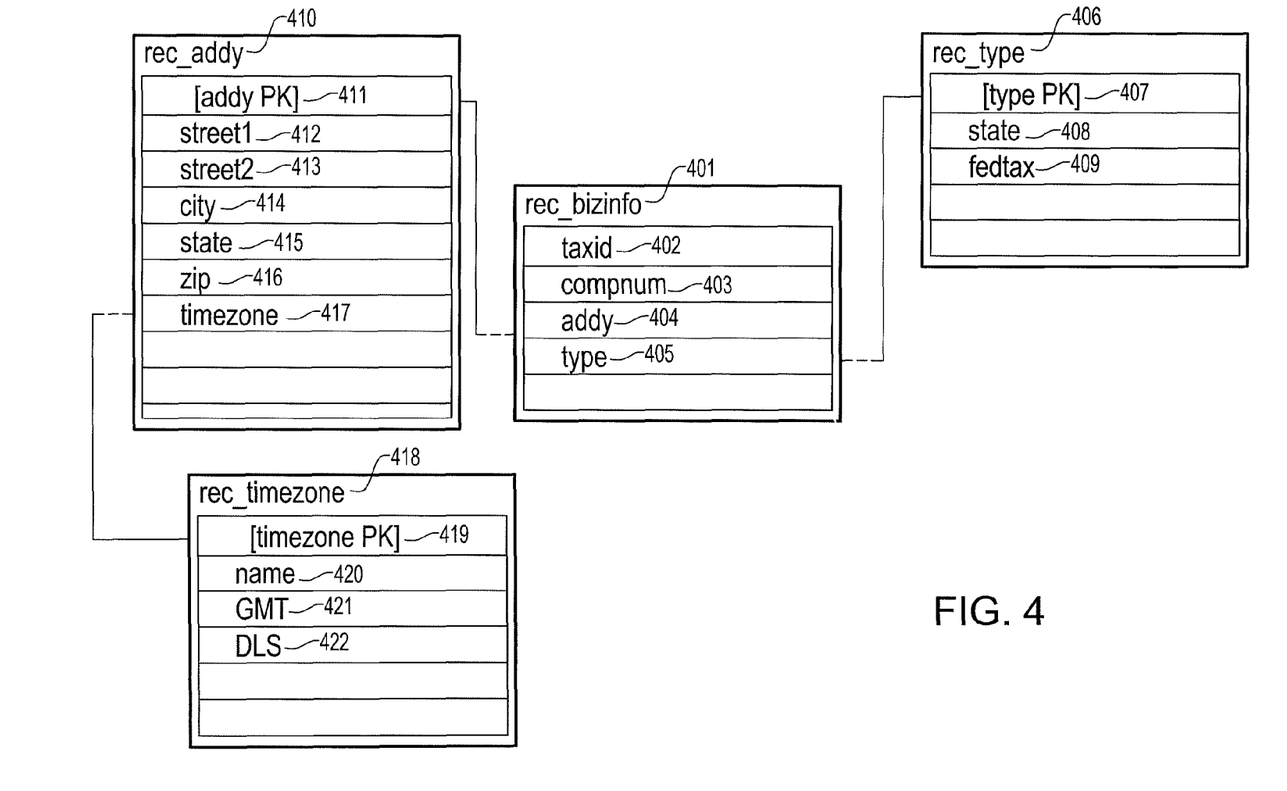
FIGS. 4-6 are diagrams illustrating examples and concepts relevant to the invention.

FIG. 4 illustrates the relationship between records and fields. The BizInfo record 401 contains four fields: taxid 402, compnum 403, addy 404, and type 405. Field addy 404 is linked to record addy 410. The actual value of field addy 404 for any particular record bizinfo 401 could be a foreign key enabling a unique record addy 410 to be accessed. The record addy 410 could include addy_PK 411, a primary key uniquely identifying particular addy records.

Record addy 410 contains six fields in addition to addy_PK 411: street1 412, street2 413, city 414, state 415, zip 416, and timezone 417. The timezone 417 field is linked to the timezone record 418, which itself contains four fields: timezone_PK (primary key) 419, name 420, GMT 421, and DLS 422. The actual field timezone 417 would contain a foreign key indexed to the timezone_PK 419 field of the timezone record 418, allowing for unique identification of the relevant data.

Similarly, the record bizinfo 401 contains the field type 405 that is linked to record type 406 containing fields type_PK (primary key) 407, state 408, and fedtax 409. The actual field type 405 would contain a foreign key indexed to type_PK 407, allowing for unique identification of the relevant data.

Figure 5:
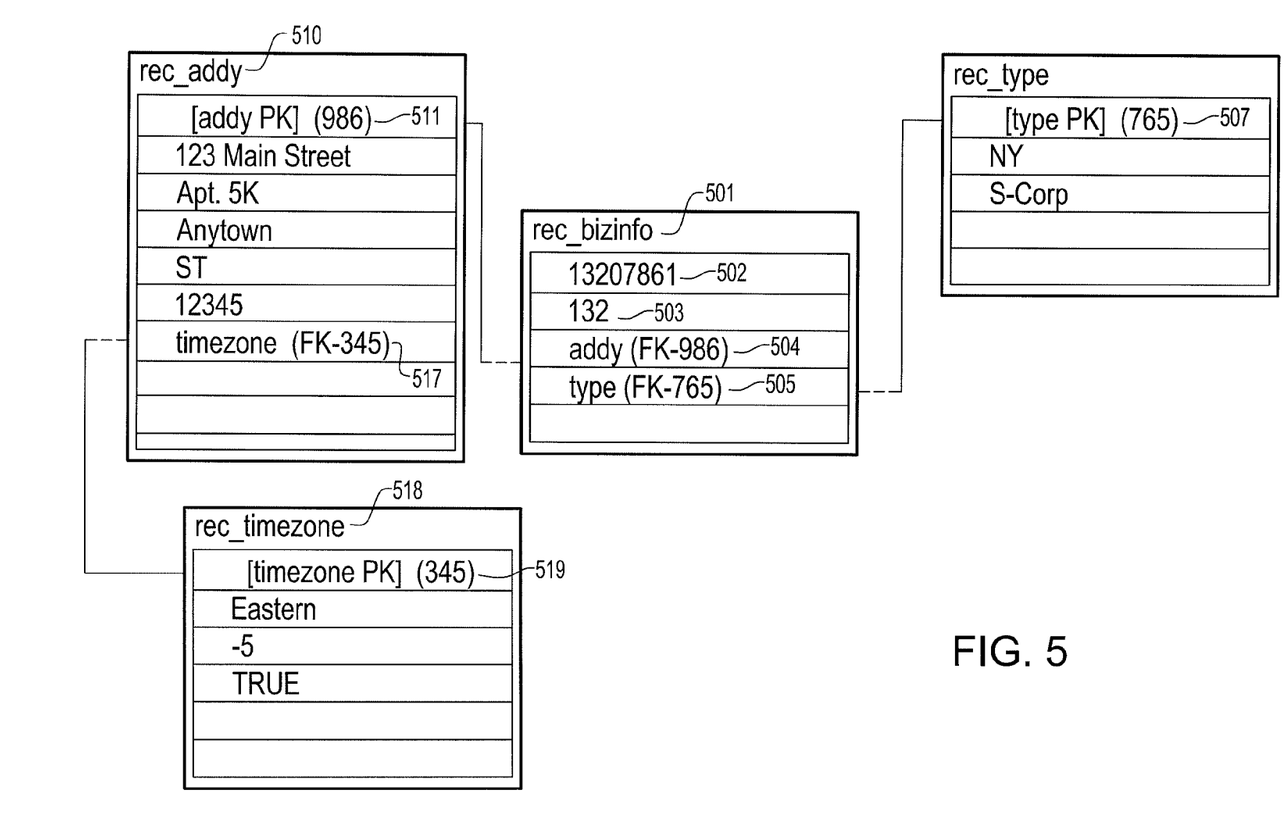

FIG. 5 illustrates one of the bizinfo records 401, containing data as appropriate within the fields. Bizinfo record 501 contains data 502 within the field taxid 402, and other data 503 within field compnum 403. Similarly, the addy field 404 contains a '986' as a foreign key 504, which allows the addy record 510 to be accessed uniquely, per its matching '986' as a primary key 511 on that dataset.

Similarly, field type_PK 507 contains primary key '765' demonstrating access by the bizinfo record 501 through its field type 505. Field timezone 517 contains '345' as a foreign key, identified with the primary key of timezone record 518, particularly key '345,' the timezone_PK field 519.

Figure 6:
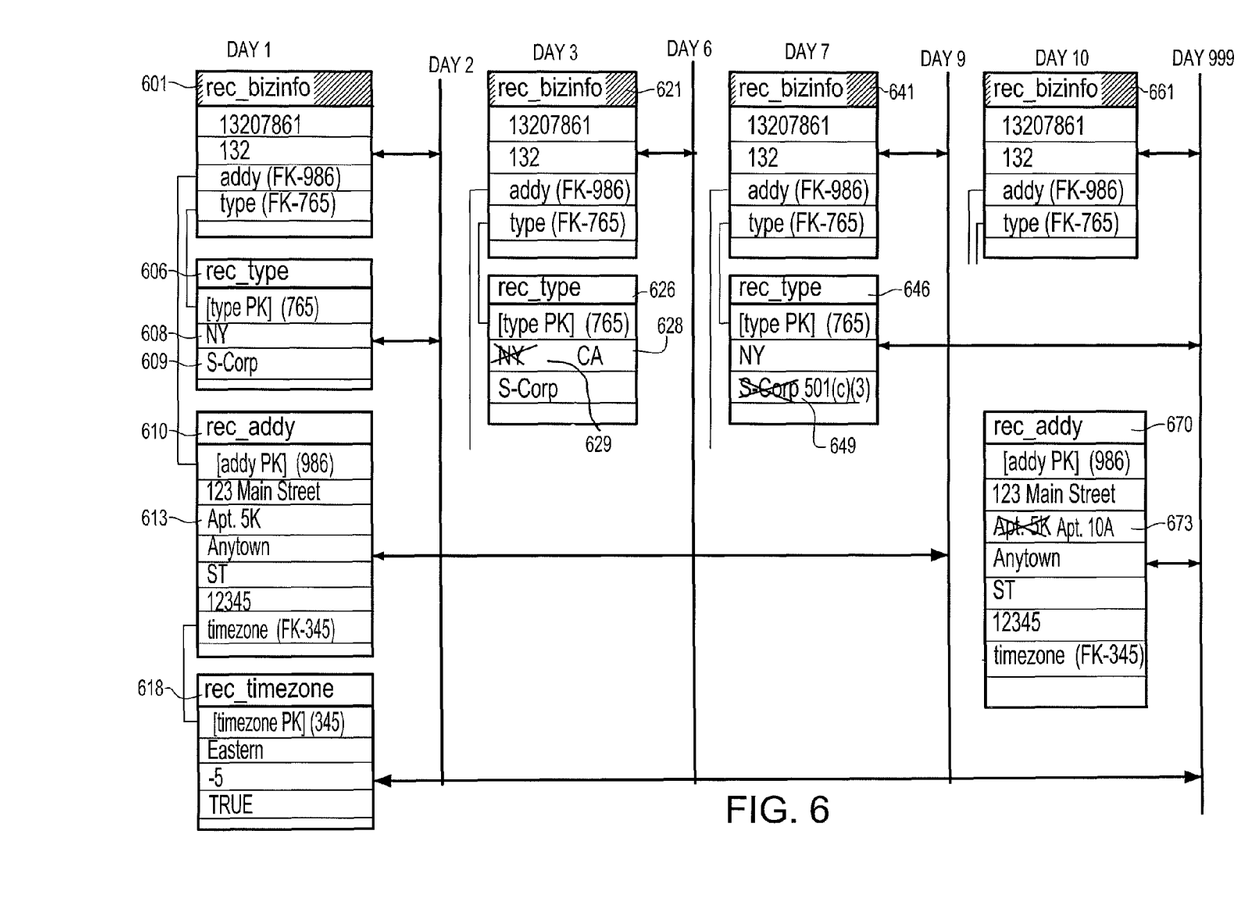

FIG. 6 illustrates changes in a bizinfo record over time, and the concept of boundary dates. The entire bizinfo record 601 is created on Day 1. All the fields of the particular bizinfo record 601 are created on Day 1, including particularly the state field 608 in the type record 606, the fedtax field 609 in the type record 608, the street2 field 613 in the addy record 610, and the entirety of the timezone record 618.

The state of incorporation (rec_type_state) 608 is changed 628 on Day 3. The boundary dates of rec_type 606 are an effective date of Day 1 and an end date of Day 2. On Day 3, the boundary dates of the rec_type of Day 3 626 would be an effective date of Day 3 and an end date of Day 999.

The fedtax information 629 within the rec_type of Day 3 626 was unchanged on Day 3, but is changed 649 on Day 7. As of Day 7, the boundary dates of the rec_type of Day 3 626 are an effective date of Day 3 and an end date of Day 6, and the boundary dates of the rec_type of Day 7 646 are an effective date of Day 7 and an end date of Day 999.

The second line street address (rec_addy_street2) 613 within the rec_addy of Day 1 610 is changed 673 on Day 10. As of Day 10, the addy record (rec_addy) of Day 1 613 has an effective date of Day 1 and an end date of Day 9. The boundary dates of rec_addy of Day 10 670 are an effective date of Day 10 and an end date of Day 999.

The timezone record (rec_timezone) 618 is unchanged from its creation on Day 1, such that the boundary dates for that record are an effective date of Day 1 and an end date of Day 999.

Note that the bizinfo record 601 reflects a change congruent to each of the other record changes. The bizinfo record (rec_bizinfo) of Day 1 has an effective date of Day 1 and an end date of Day 2, corresponding to the boundary dates of the rec_type of Day 1 606. Rec_bizinfo of Day 3 621 has an effective date of Day 3 and an end date of Day 6, corresponding to the boundary dates of rec_type of day 3 626. Rec_bizinfo of Day 7 641 has an effective date of Day 7 and an end date of Day 9, corresponding to the boundary dates of rec_type of Day 7 646. Rec_bizinfo of Day 10 661 has an effective date of Day 10 and an end date of Day 999, corresponding to the boundary dates of rec_addy of Day 10 670.

Figure 7:
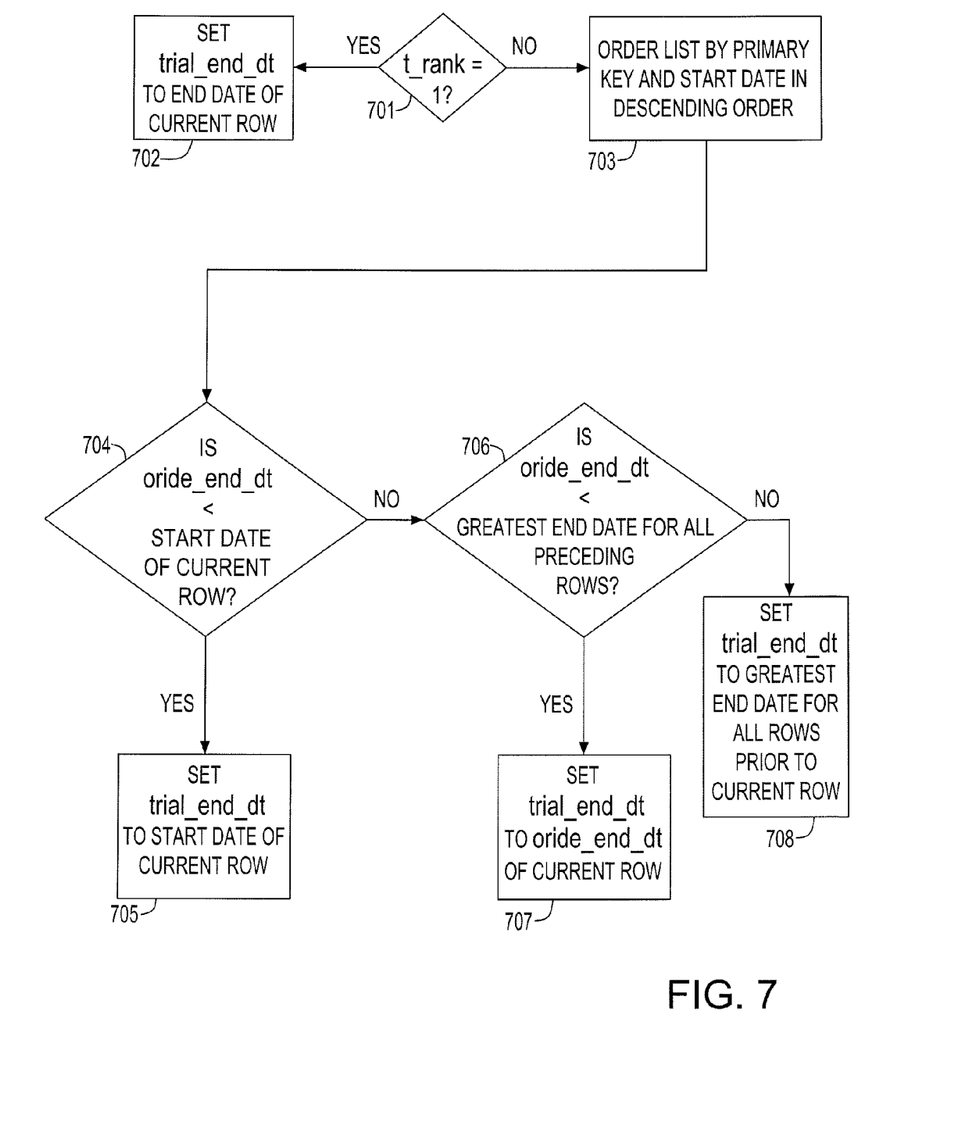
FIG. 7 is a flow diagram showing processes that correspond to a portion of the overall system or process in accordance with the principles of the invention.

FIG. 7 is a flow diagram showing processes that correspond to a portion of the overall system or process in accordance with the principles of the invention. Particularly, FIG. 7 is a flow diagram demonstrating one implementation of the logic for deriving the trial_end_dt, as described above.

The DCDC may determine if the t_rank of the row under examination is equal to 1 701. If so, then the DCDC may set the trial_end_dt to the end date of the row in question 702.

If not, the DCDC may reorder the table in descending order by primary key and effective date 703.

The DCDC may then determine if the oride_end_dt is less than the start date of the row in question 704. If it is, the DCDC may set the trial_end_dt to the start date of the current row 705.

If not, the DCDC may then determine if the oride_end_dt is less than the greatest end date for all rows preceding the current row 706. If so, the DCDC may set trial_end_dt to the oride_end_dt of the current row 707.

If not, the DCDC may then set the trial_end_dt to the greatest end date for all rows prior to the current row 708.

Thus, systems or methods for virtually and/or dynamically generating ES views from one or more original DWs are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for producing an element-specific ("ES") view within one or more relational databases, the method using a first record and a second record stored in the relational databases, the first record and the second record related by a foreign key, the first record comprising, a first effective date and a first end date, the second record comprising a second effective date and a second end date, the method comprising:
    generating a composite key, the composite key comprising a distinct list of dates, the generating comprising:
        assigning a first rank to the first record;
        assigning a second rank to the second record;
        deriving a first override end date for the first record;
        deriving a second override end date for second record;
        deriving a first trial end date for the first record, the first trial end date based on:
            the first effective date;
            the first end date;
            the first rank; and
            the first override end date;
        deriving a second trial end date for the second record the second trial end date based on:
            the second effective date;
            the second end date;
            the second rank; and
            the second override end date;
        when the first effective date is different from the second effective date the composite key comprises:
            the first effective date and the first trial end date; and
            the second effective date and the second trial end date;
        when the first effective date is identical to the second effective date:
            comparing the first trial end date to the second trial end date
            based on the comparing selecting one of:
                the first effective date and the first trial end date; or
                the second effective date and the second trial end date; and
                the composite key comprises the selected effective date and the selected trial end date;
    correlating a first table and a second table to the composite key; and
    forming the ES view based on the correlating.

2. The media of claim 1 further comprising computer executable instructions embodied therein for producing the ES view, wherein:
the first record is stored in the first table; and
the second record is stored in the first table.

3. The media of claim 1 further comprising computer executable instructions embodied therein for producing the ES view, wherein:
the first record is stored in the second table; and
the second record is stored in the second table, 4. The media of claim 1 further comprising computer executable instructions embodied therein for producing the ES view, wherein:
the first record is stored in the first table; and
the second record is stored in the second table.

5. The media of claim 1 further comprising computer executable instructions embodied therein for producing the ES view, wherein:
the first record is a $record_i$, i=, 1, 2, 3 ... (I−1);
the second record is a $record_{i+1}$, i=0, 1, 2, 3 ... (I−1); and
$record_i$ and $record_{i+1}$ are two records in a plurality of $records_j$, j=0, 1, 2, 3 ... I.

6. The media of claim 2, further comprising computer executable instructions embodied therein for producing the ES view, wherein:
the first record comprises a first entry selected for inclusion in the ES view;
the second record comprises the a second entry for inclusion in the ES view;
the computer executable instructions for:
assigning a third rank to the first record;
assigning a fourth rank to the second record, the fourth rank based on a position of the second record within the first table;
comparing the second entry to the first entry;
if the second entry is identical to the first entry:
assigning the third rank to the second record; and
positioning the second record relative to the first record based on the third rank and. the fourth rank;
if the second entry is different from the first entry:
assigning a fifth rank to the second record; and
positioning the second record relative to the first record based on the fourth rank and the fifth rank.

7. The media of claim 6, further comprising computer executable instructions embodied therein for producing the ES view wherein, the second entry is identical to the first entry and the second record is assigned the third rank, the computer executable instructions for:
if the fourth rank corresponds to a position in the first table adjacent to the first record, assigning the second record a sixth rank, the sixth rank equal to a predetermined identifier;
if the fourth rank does not correspond to the position in the first table adjacent to the first record, assigning the second record a sixth rank, the sixth rank equal to the fourth rank.

8. The media of claim 7, further comprising computer executable instructions embodied therein for:
merging the first record and the second record when the second record is assigned the third rank and the sixth rank is equal to the predetermined identifier.

9. The media of claim 8 wherein the computer executable instructions embodied therein for merging comprise computer executable instructions for:
selecting the earliest effective date from among the first effective date and the second effective date;
selecting the latest end date from among the first end date and the second end date; and
pairing the merged record to the composite key.

* * * * *